Patented Apr. 27, 1954

2,676,988

UNITED STATES PATENT OFFICE 2,676,988

METHOD OF MAKING VITAMIN A AND INTERMEDIATES FORMED THEREBY

Charles D. Robeson and Jacque K. Lindsay, Rochester, N. Y., assignors to Eastman Kodak Company, Rochester, N. Y., a corporation of New Jersey No Drawing. Application September 11, 1951, Serial No. 246,169

12 Claims. (Cl. 260—586)

This invention relates to methods of synthesizing vitamin A and to intermediates prepared in such syntheses.

The synthesis of vitamin A in good yield is complicated by the complexity and specific nature of the vitamin A molecular structure, and by the inherent instability of vitamin A intermediates with their consequent tendency to decompose, isomerize, and/or undergo undesirable side reactions. Thus, for example, incomplete conjugation of the polyene linkages or saturation of one or more of the polyene linkages or introduction of a chain substituent other than on the terminal carbon atom results in a compound of reduced or no vitamin A activity. Consequently, the successful synthesis of vitamin A depends upon the right combination of particular method steps with certain reactants, which combine to give vitamin A-active material in good yield as a product.

It is accordingly an object of this invention to provide a new method of synthesizing vitamin A in good yield.

It is also an object of this invention to provide a new combination of method steps employing particular reactants which combine to produce vitamin A.

Another object of the invention is to provide an improved method of synthesizing vitamin A without the objectionable yield losses due to isomerization, side reactions and the like normally attendant to vitamin A syntheses.

Another object of the invention is to provide an effective method of converting $\beta$-ionylidene acetaldehyde to vitamin A-active material.

Another object of the invention is to provide new and useful vitamin A intermediates.

Another object of the invention is to provide a new method of synthesizing vitamin A through a polyene ketoacetal and a hydroxy derivative thereof while minimizing the difficulties and yield losses due to dehydration of a hydroxy compound.

Other objects will be apparent from the description and claims which follow.

These and other objects of the invention are attained by means of the processes embodying this invention and comprising condensing $\beta$-ionylidene acetaldehyde with an acetal of acetoacetaldehyde to form a polyene ketoacetal, reacting the polyene ketoacetal with methyl magnesium halide and thus converting the polyene ketoacetal to $\alpha,\beta$-dihydro-$\beta$-hydroxy vitamin A acetal, that is, an acetal of $\alpha,\beta$-dihydro-$\beta$-hydroxy vitamin A aldehyde, and converting the $\alpha,\beta$-dihydro-$\beta$-hydroxy vitamin A acetal to vitamin A-active material, the converting including dehydrating the $\alpha,\beta$-dihydro-$\beta$-hydroxy vitamin A acetal. In a preferred embodiment of the invention, the $\alpha,\beta$-dihydro-$\beta$-hydroxy vitamin A acetal is converted to vitamin A alcohol by first converting it to vitamin A aldehyde and reducing the vitamin A aldehyde to vitamin A alcohol. The conversion to vitamin A aldehyde comprises subjecting the $\alpha,\beta$-dihydro-$\beta$-hydroxy vitamin A acetal to dehydration, hydrolysis and treatment with basic material, either sequentially or simultaneously as described more fully hereinafter whereby the hydroxy acetal is converted to vitamin A aldehyde. The reduction of vitamin A aldehyde to vitamin A alcohol is readily effected by means of an ether-soluble metal hydride or by means of an aluminum alkoxide and the corresponding alcohol or similar process for reducing olefinic aldehydes to the corresponding olefinic alcohols.

In practising this invention, the synthesis can be carried out in separate steps with isolation and purification of the intermediates if desired. In preferred embodiments, one or more of the steps are combined or carried out in a single reaction mixture as described more fully hereinafter and it will be understood that all such embodiments are within the scope of the invention. Various mechanisms may be advanced to explain the observed results without changing the operative steps set out.

As an initial step in the synthesis, $\beta$-ionylidene acetaldehyde is condensed with an acetal of acetoacetaldehyde. Any of the open or cyclic acetals of acetoacetaldehyde can be employed since the acetal group serves only to protect the aldehydic carbonyl group and does not enter into nor affect the course of this or subsequent reactions, the acetal group being subsequently hydrolyzed to an aldehyde. For convenience, the dialkyl acetals of acetoacetaldehyde such as the dimethoxy, diethoxy, dipropoxy or dibutoxy acetals are desirably employed, although aryl, aralkyl or mixed acetals can be employed as well as cyclic acetals as prepared from a glycol such as ethylene or propylene glycol or the like.

The condensation is promoted by the presence in the reaction mixture of an aldehyde-ketone condensation catalyst, the alkoxides such as sodium methoxide, sodium ethoxide, aluminum isopropoxide, aluminum t-butoxide, magnesium isopropoxide, potassium methoxide, sodium propoxide and the like being preferred for optimum results although the amine salts such as piperidene acetate, pyridine hydrochloride, quinoline hydrobromide and the like can also be used as well as other aldehydeketone condensation catalysts.

The condensation results in the formation of a polyene ketoacetal, that is, an acetal of the ketoaldehyde, 7-methyl-9-(2,6,6-trimethyl cyclohex-1-enyl) nona-4,6,8-triene-3-one-1-al. The condensation is illustrated by the following equation of the condensation of a dialkyl acetal of acetoacetaldehyde with β-ionylidene acetaldehyde, R and R′ being alkyl radicals:

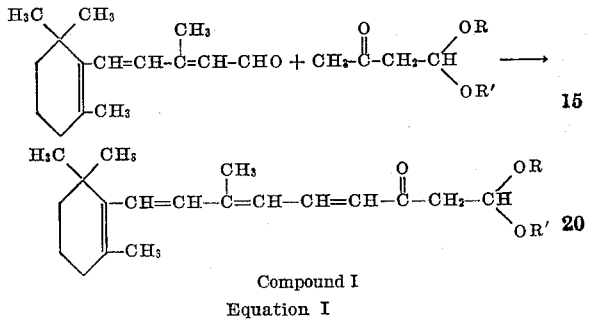

Compound I
Equation I

The polyene ketoacetal, Compound I, is thereafter converted to α,β-dihydro-β-hydroxy vitamin A acetal by reacting the polyene ketoacetal with methyl magnesium halide, methyl magnesium bromide being preferred for optimum results although the other well-known halides such as the chloride and iodide can be employed. The conversion of the polyene ketoacetal, Compound I, to α,β-dihydro-β-hydroxy vitamin A acetal is illustrated graphically by the following equation wherein X is a halogen atom and R and R′ are alkyl radicals:

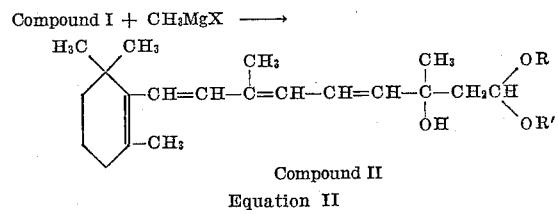

Compound II
Equation II

In effecting the conversion of the polyene ketoacetal to α,β-dihydro-β-hydroxy vitamin A acetal, the magnesium complex present in the product is readily hydrolyzed to the desired α,β-dihydro-β-hydroxy vitamin A acetal by means of water, dilute acid, or ammonium salt solution or other well-known hydrolysis means in accordance with usual practices.

The α,β-dihydro-β-hydroxy vitamin A acetal as illustrated by Compound II is thereafter converted to vitamin A-active material, preferably including conversion to vitamin A alcohol through vitamin A aldehyde. The conversion to vitamin A-active material can be effected in separate steps or in combinations of steps, the conversion to vitamin A aldehyde in each case involving dehydration and hydrolysis of the α,β-dihydro-β-hydroxy vitamin A acetal and treatment with a basic catalyst either as a separate step or in combination with the dehydration and hydrolysis in a single reaction mixture or in combination with the reduction of the vitamin A aldehyde to vitamin A alcohol.

For purposes of illustration, a sequential conversion of α,β-dihydro-β-hydroxy vitamin A acetal in separate steps is set out, certain combinations of steps and preferred embodiments being described more fully hereinafter.

Compound II is thereafter dehydrated and hydrolyzed with an ionizable acid in a suitable organic solvent, to form a Compound III for which the structure set out in the following equation has been postulated. Mineral acids such as hydrochloric acid, sulfuric acid, phosphoric acid or the like are preferred, in solution in a solvent such as acetone, methyl alcohol, methyl ethyl ketone or the like, although other ionizable acids such as p-toluene sulfonic acid can be used. The conversion of Compound II to the Compound III is illustrated by the following equation:

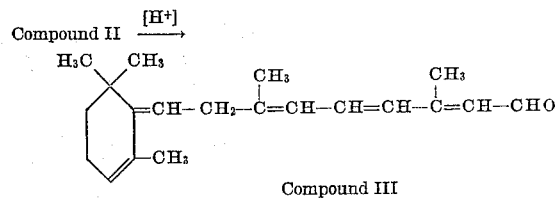

Compound III

Compound III is readily rearranged to vitamin A aldehyde in high yield by treating Compound III with a basic catalyst desirably in solvent solution. Any of the well-known basic materials are effective to catalyze the rearrangement which proceeds at room temperature or at elevated temperatures. Typical basic materials which catalyze the rearrangement include inorganic bases such as sodium hydroxide, potassium hydroxide and the like, basic salts such as potassium acetate, sodium acetate and the like, organic bases such as pyridine, quinoline, lutidines, picolines, piperidine, aniline; as well as basic adsorbents such as sodium aluminum silicate, alkaline soaps, and similar well-known materials of basic character.

Vitamin A aldehyde is then reduced to vitamin A alcohol by well-known methods such as reduction with an ether-soluble metal hydride as typified by lithium aluminum hydride, lithium borohydride, sodium hydride or the like, or reduction with an aluminum alkoxide and the corresponding monohydric alcohol, such alkoxide as aluminum isopropoxide, aluminum t-butoxide being typical.

In a preferred embodiment, rearrangement of the Compound III, to vitamin A aldehyde and reduction of the vitamin A aldehyde to vitamin A alcohol in a single reaction mixture is effected by treating Compound III with a basic reducing agent, both the ether-soluble metal hydrides and the aluminum alkoxides being effective for this purpose as well as other well-known basic reducing agents.

In a further embodiment, dehydration and hydrolysis of α,β-dihydro-β-hydroxy vitamin A acetal and rearrangement of Compound III formed thereby is effected in a single reaction step by treating Compound II with a mixture of an ionizable acid and an organic base added as separate constituents or as an acid-organic base addition product. Any of the well-known ionizable acids can be employed with the mineral acids being preferred and the hydrohalic acids such as hydrochloric acid or hydrobromic acid being especially suitable. Similarly any of the well-known organic bases such as pyridine, quinoline, piperidine, lutidine, aniline, picolines, morpholine and the like can be used successfully. For convenience, the acid-base components can be added as a single compound such as an amine hydrohalide, pyridine hydrochloride and quinoline hydrobromide being typical.

Vitamin A alcohol as produced by processes embodying this invention is, of course, readily esterified by well-known esterification processes to form the corresponding esters such as the acetate or palmitate ester or the like, vitamin A commonly being sold commercially in the ester form.

The invention is illustrated by the following examples of preferred embodiments thereof. The ultra-violet absorption (E) values in the following examples were determined in ethanol solution in accordance with usual practice.

Example 1

A mixture of 11.0 g. of β-ionylidene acetaldehyde and 25 cc. of dimethoxy acetal of acetoacetaldehyde was cooled to —20° C., and to this waas added, in dropwise fashion, an alcoholic solution of sodium methoxide prepared from 1.15 g. of sodium metal and 30 cc. of methyl alcohol. The resulting reaction mixture was permitted to warm up to room temperature, then cooled to —20° C. again and allowed to stand overnight at such temperature. The mixture was then diluted with four volumes of water, and extracted with ether. The ether extract was washed to neutrality with water, dried over anhydrous sodium sulfate and the solvent removed under nitrogen to give 19.6 g. of 1,1-dimethoxy-7-methyl-9-(2,6,6 - trimethyl cyclohex - 1 - enyl) nona-4,6,8-triene-3-one as a dark red oil having $$E^{1\%}_{1 cm.} (350\ m\mu) = 570$$

Example 2

A mixture of 58 ml. of ethyl alcohol and 2.3 g. of metallic sodium was charged into a reaction flask. After formation of sodium ethoxide, the mixture was cooled to —20° C. and a mixture of 22.0 g. of β-ionylidene acetaldehyde and 44 cc. of acetoacetaldehyde diethoxy acetal was added rapidly with stirring. The stirring was continued for 1 hour during which time the reaction temperature was allowed to gradually rise to 0° C. The reaction mixture was then allowed to stand overnight at 0–5° C. The mixture was then diluted with four volumes of water and extracted with ether. The ether extract was washed to neutrality with water, dried and the solvent removed under nitrogen to give 26.34 g. of 1,1 - diethoxy - 7 - methyl-9-(2,6,6-trimethyl cyclohex-1-enyl) nona-4,6,8-triene-3-one as a dark red oil having $$E^{1\%}_{1 cm.} (350\ m\mu) = 322$$

Example 3

A 1.35 g. portion of magnesium turnings was charged into a reaction flask, 7.9 g. of methyl iodide added, and the resulting mixture diluted with 50 ml. of ether and refluxed for 10 minutes to ensure complete formation of methyl magnesium iodide reagent. To the reagent solution was added 10.0 g. of polyene ketoacetal as prepared in Example 1, the addition being carried out in dropwise fashion at a rate sufficient to maintain reflux of the reaction mixture. After addition of the polyene ketoacetal solution was completed, the reaction mixture was refluxed for an additional 15 minutes and then allowed to stand for 1 hour at room temperature while being stirred. The mixture was then cooled by means of a Dry Ice-acetone bath and magnesium complex hydrolyzed by the addition of saturated ammonium chloride solution. The aqueous layer was extracted several times with ether, and the combined ether phases were washed to neutrality with water, dried and the ether removed under nitrogen to give 9.17 g. of α,β-dihydro-β-hydroxy vitamin A dimethyl acetal as an orange-red oil having $$E^{1\%}_{1 cm.} (287\ m\mu) = 646$$

Example 4

A 2.0 g. portion of α,β-dihydro-β-hydroxy vitamin A dimethyl acetal was dissolved in 40 cc. of acetone containing 4 drops of concentrated hydrochloric acid. The mixture was refluxed for 15 minutes, cooled, diluted with ether, and washed free of acid with 0.5 N. potassium hydroxide. The ether layer was separated, washed to neutrality with water, dried, and the ether removed under nitrogen to give 1.76 g. of Compound III as a dark red oil having $$E^{1\%}_{1 cm.} (332\ m\mu) = 675$$

Example 5

The product obtained by the process of Example 4 was washed through a column of 174 g. of synthetic sodium aluminum silicate by means of petroleum ether. The basic adsorbent effected rearrangement of Compound II and 1.17 g. of vitamin A aldehyde having $$E^{1\%}_{1 cm.} (372\ m\mu) = 780$$

was obtained as product.

Example 6

A 1.02 g. portion of vitamin A aldehyde was dissolved in 5 cc. of dry ether. To the resulting solution, 1.2 cc. of a 1.6 M. solution of lithium aluminum hydride in dry ether was added as rapidly as possible. Immediately following addition of the hydride solution, acetone and 5% aqueous hydrochloric acid were added to the reaction mixture successively to decompose the lithium aluminum hydride. The reaction product was extracted with ether, the extract washed three times with 5% aqueous hydrochloric acid, twice with 0.5 N. potassium hydroxide solution, and then washed to neutrality with water. After removal of the solvent by evaporation, 1.04 g. of a vitamin A alcohol concentrate was obtained having $$E^{1\%}_{1 cm.} (325\ m\mu) = 906$$

and a vitamin A potency by blue color assay of 1,620,000 units per gram.

Example 7

A solution was prepared of 2.0 g. of α,β-dihydro-α-hydroxy vitamin A dimethyl acetyl, 0.4 g. of fused potassium acetate and 0.4 cc. of acetic anhydride in 40 cc. of acetic acid. The solution was heated at 70–75° C. for 24 hours and then extracted with ether. The ether extract was washed with 0.5 N. potassium hydroxide solution and then washed to neutrality with water. The solvent was removed by evaporation to give 1.74 g. of vitamin A aldehyde as a dark red oil having $$E^{1\%}_{1 cm.} (368\ m\mu) = 501$$

Example 8

Simultaneous rearrangement and reduction of the Compound III, in a single reaction step was effected by adding 3.8 ml. of a 1 M. ethereal solution of lithium aluminum hydride diluted with 3.8 ml. of anhydrous ether to 0.63 g. of Compound III dissolved in 6.3 ml. of anhydrous ether. The addition was effected in about 30 seconds during which time the reaction mixture refluxed vigorously. After the addition was completed, the mixture was stirred for 1 minute, and the excess hydride decomposed by the addition of wet acetone. The mixture was extracted with ether and the ether extract was washed successively with sodium bicarbonate solution and water. The extract was dried over anhydrous sodium sulfate and the solvent removed by evaporation to give a vitamin A alcohol concentrate having $$E_{1\,cm.}^{1\%} (328\ m\mu) = 566$$

Example 9

To a suspension of 1.35 g. of aluminum isopropoxide in 10 ml. of isopropyl alcohol was added 0.61 g. of Compound III dissolved in 25 ml. of isopropyl alcohol. The resulting reaction mixture was refluxed until the distillate gave a negative acetone test with 2,4-dinitrophenyl hydrazine. The excess alcohol was then distilled off under vacuum, the residue was cooled and the excess aluminum isopropoxide was decomposed by the addition of 20 ml. of 10% sulfuric acid. The mixture was extracted with ether and the ether extract washed to neutrality with water. The ether was removed by evaporation to give a vitamin A alcohol concentrate having $$E_{1\,cm.}^{1\%} (328\ m\mu) = 690$$

Example 10

A 1.0 g. portion of $\alpha,\beta$-dihydro-$\beta$-hydroxy vitamin A dimethyl acetal was dissolved in 8 cc. of methyl ethyl ketone and to this was added 4 cc. of methyl ethyl ketone containing 0.11 g. of quinoline and 2 cc. of methyl ethyl ketone containing 0.12 g. of concentrated hydrochloric acid. The resulting mixture was refluxed for 2 hours, and the product obtained thereby was a vitamin A aldehyde concentrate having the characteristic $\lambda$ max.$=372\ m\mu$.

The invention thus provides a new and effective method of converting $\beta$-ionylidene acetaldehyde to vitamin A-active material while minimizing the difficulties and objectionable yield losses normally attendant to vitamin A syntheses.

Although the invention has been described in considerable detail with reference to certain preferred embodiments, it will be understood that variations and modifications can be effected within the spirit and scope of the invention as described hereinabove and as defined in the appended claims.

We claim:

1. In the synthesis of vitamin A, the steps which comprise condensing $\beta$-ionylidene acetaldehyde with an acetal of acetoacetaldehyde and thereby forming a polyene ketoacetal, reacting said polyene ketoacetal with methyl magnesium halide and hydrolyzing the product of said reacting and thereby forming $\alpha,\beta$-dihydro-$\beta$-hydroxy vitamin A acetal.

2. The method of making vitamin A which comprises condensing $\beta$-ionylidene acetaldehyde with an acetal of aceto-acetaldehyde and thereby forming a polyene ketoacetal, reacting said polyene ketoacetal with methyl magnesium halide and hydrolyzing the product of said reacting and thereby forming $\alpha,\beta$-dihydro-$\beta$-hydroxy vitamin A acetal, and converting said $\alpha,\beta$-dihydro-$\beta$-hydroxy vitamin A acetal to vitamin A alcohol, said converting comprising treating said $\alpha,\beta$-dihydro-$\beta$-hydroxy vitamin A acetal with an ionizable acid and an organic base and thereby dehydrating and hydrolyzing said $\alpha,\beta$-dihydro-$\beta$-hydroxy vitamin A acetal to vitamin A aldehyde and reducing said vitamin A aldehyde to vitamin A alcohol.

3. The method of making vitamin A which comprises condensing $\beta$-ionylidene acetaldehyde with an acetal of acetoacetaldehyde and thereby forming a polyene ketoacetal, reacting said polyene ketoacetal with methyl magnesium halide and hydrolyzing the product of said reacting and thereby forming $\alpha,\beta$-dihydro-$\beta$-hydroxy vitamin A acetal, and converting said $\alpha,\beta$-dihydro-$\beta$-hydroxy vitamin A acetal to vitamin A alcohol, said converting comprising treating said $\alpha,\beta$-dihydro-$\beta$-hydroxy vitamin A acetal with a mineral acid and thereby dehydrating and hydrolyzing said $\alpha,\beta$-dihydro-$\beta$-hydroxy vitamin A acetal, treating the resulting product with a basic material and thereby forming vitamin A aldehyde, and reducing said vitamin A aldehyde to vitamin A alcohol.

4. The method of making vitamin A which comprises condensing $\beta$-ionylidene acetaldehyde with an acetal of acetoacetaldehyde and thereby forming a polyene ketoacetal, reacting said polyene ketoacetal with methyl magnesium halide and hydrolyzing the product of said reacting and thereby forming $\alpha,\beta$-dihydro-$\beta$-hydroxy vitamin A acetal, and converting said $\alpha,\beta$-hydro-$\beta$-hydroxy vitamin A acetal to vitamin A alcohol, said converting comprising dehydrating and hydrolyzing said $\alpha,\beta$-dihydro-$\beta$-hydroxy vitamin A acetal with a mineral acid and treating the resulting product with a basic reducing agent and thereby forming vitamin A alcohol.

5. In the synthesis of vitamin A, the method of making material which is convertible to vitamin A by dehydration, hydrolysis and reduction which comprises condensing $\beta$-ionylidene acetaldehyde with a dialkyl acetal of acetoacetaldehyde in the present of an alkoxide and thereby forming a ketoacetal of the formula

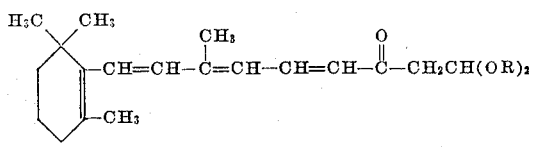

wherein R is an alkyl radical, reacting said ketoacetal with methyl magnesium bromide and hydrolyzing the product of said reacting and thereby forming $\alpha,\beta$-dihydro-$\beta$-hydroxy vitamin A dialkyl acetal of the formula

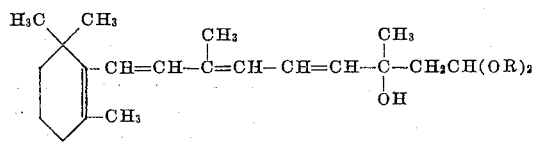

6. The method of making vitamin A which comprises condensing $\beta$-ionylidene acetaldehyde with a dialkyl acetal of acetoacetaldehyde in the presence of an alkoxide and thereby forming a ketoacetal of the formula

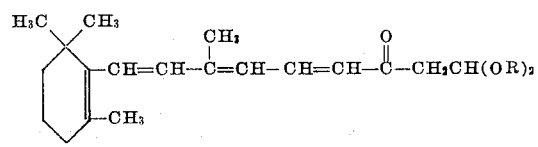

wherein R is an alkyl radical, reacting said ketoacetal with methyl magnesium bromide and hydrolyzing the product of said reacting and thereby forming α,β-dihydro-β-hydroxy vitamin A dialkyl acetal of the formula

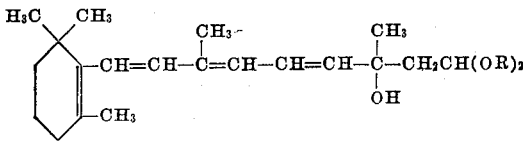

and converting said α,β-dihydro-β-hydroxy vitamin A dialkyl acetal to vitamin A alcohol, said converting comprising dehydrating and hydrolyzing said α,β-dihydro-β-hydroxy vitamin A dialkyl acetal to aldehydic material, and reducing said aldehydic material to vitamin A alcohol.

7. The method of making vitamin A which comprises condensing β-ionylidene acetaldehyde with a dialkyl acetal of acetoacetaldehyde in the presence of an alkoxide and thereby forming a ketoacetal of the formula

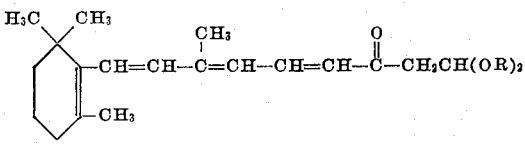

wherein R is an alkyl radical, reacting said ketoacetal with methyl magnesium bromide and hydrolyzing the product of said reacting and thereby forming α,β-dihydro-β-hydroxy vitamin A dialkyl acetal of the formula

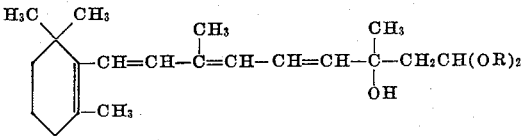

and converting said α,β-dihydro-β-hydroxy vitamin A dialkyl acetal to vitamin A alcohol, said converting including dehydrating and hydrolyzing said α,β-dihydro-β-hydroxy vitamin A dialkyl acetal by treating said α,β-dihydro-β-hydroxy vitamin A dialkyl acetal with an ionizable acid and an organic base and thereby forming vitamin A aldehyde, and reducing said vitamin A aldehyde to vitamin A alcohol.

8. The method of making vitamin A which comprises condensing β-ionylidene acetaldehyde with a dialkyl acetal of acetoacetaldehyde in the presence of an alkoxide and thereby forming a ketoacetal of the formula

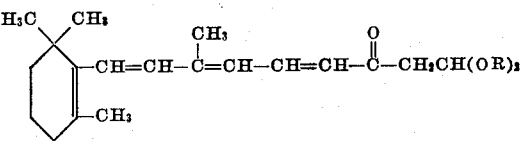

wherein R is an alkyl radical, reacting said ketoacetal with methyl magnesium bromide and hydrolyzing the resulting reaction product and thereby forming α,β-dihydro-β-hydroxy vitamin A dialkyl acetal of the formula

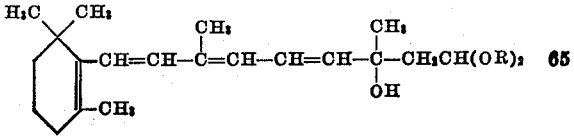

and converting said α,β-dihydro-β-hydroxy vitamin A dialkyl acetal to vitamin A alcohol, said converting including dehydrating and hydrolyzing said α,β-dihydro-β-hydroxy vitamin A dialkyl acetal by treating said α,β-dihydro-β-hydroxy vitamin A dialkyl acetal with a hydrohalic acid and an organic base and thereby forming vitamin A aldehyde and reducing said vitamin A aldehyde to vitamin A alcohol.

9. An acetal of the ketoaldehyde of the formula

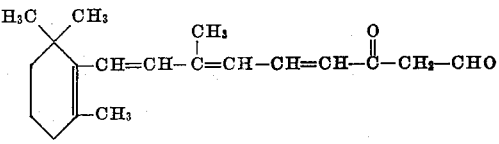

10. A ketoacetal of the formula

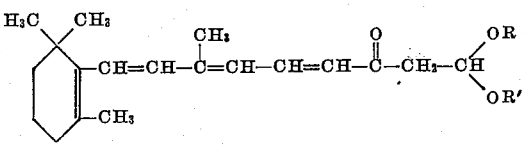

wherein R and R' are alkyl radicals.

11. The method of making vitamin A which comprises condensing β-ionylidene acetaldehyde with an acetal of acetoacetaldehyde and thereby forming a polyene ketoacetal, reacting said polyene ketoacetal with methyl magnesium halide and hydrolyzing the product of said reacting to α,β-dihydro-β-hydroxy vitamin A acetal, dehydrating and hydrolyzing said α,β-dihydro-β-hydroxy vitamin A acetal to vitamin A aldehyde, and reducing said vitamin A aldehyde to vitamin A alcohol.

12. The method which comprises condensing β-ionylidene acetaldehyde with an acetal of acetoacetaldehyde and thereby forming a polyene ketoacetal, reacting said polyene ketoacetal with methyl magnesium halide and hydrolyzing the product of said reacting to α,β-dihydro-β-hydroxy vitamin A acetal, and dehydrating and hydrolyzing said α,β-dihydro-β-hydroxy vitamin A acetal.

References Cited in the file of this patent

UNITED STATES PATENTS

| Number | Name | Date |
|---|---|---|
| 2,233,375 | Kuhn et al. | Feb. 25, 1941 |
| 2,369,157 | Milas | Feb. 13, 1945 |
| 2,577,538 | Milas | Dec. 4, 1951 |
| 2,586,305 | Copenhaver | Feb. 19, 1952 |
| 2,615,922 | Starke | Oct. 28, 1952 |

FOREIGN PATENTS

| Number | Country | Date |
|---|---|---|
| 672,936 | Great Britain | May 28, 1952 |

OTHER REFERENCES

Heilbron, Chem. Soc. J. (London), year 1948, p. 386–393.